US010701051B2

(12) United States Patent
Ohsumi

(10) Patent No.: US 10,701,051 B2
(45) Date of Patent: Jun. 30, 2020

(54) AUTHENTICATION DEVICE AND COMPUTER-READABLE RECORDING MEDIUM

(71) Applicant: CASIO COMPUTER CO., LTD., Shibuya-ku, Tokyo (JP)

(72) Inventor: Tsuyoshi Ohsumi, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 179 days.

(21) Appl. No.: 15/876,531

(22) Filed: Jan. 22, 2018

(65) Prior Publication Data
US 2018/0227286 A1    Aug. 9, 2018

(30) Foreign Application Priority Data

Feb. 8, 2017    (JP) .................................. 2017-020875

(51) Int. Cl.
*H04L 29/06* (2006.01)
*G06F 21/62* (2013.01)
(Continued)

(52) U.S. Cl.
CPC .............. *H04L 63/08* (2013.01); *G06F 21/31* (2013.01); *G06F 21/45* (2013.01); *G06F 21/62* (2013.01);
(Continued)

(58) Field of Classification Search
CPC ......... H04L 63/08; H04L 67/28; H04L 63/10; H04L 63/0884; G06F 21/31; G06F 21/62; G06F 21/45
(Continued)

(56) References Cited

U.S. PATENT DOCUMENTS 7,231,595 B1 * 6/2007 Fujino ..................... G06F 21/41
   715/200
7,490,347 B1 * 2/2009 Schneider ........... H04L 63/0815
   713/157

(Continued)

FOREIGN PATENT DOCUMENTS

JP          09274628 A      10/1997
JP       2001118009 A       4/2001
(Continued)

OTHER PUBLICATIONS

Office Action (Non-Final Rejection) dated Nov. 18, 2019 issued in U.S. Appl. No. 15/879,687.
(Continued)

*Primary Examiner* — Taghi T Arani
*Assistant Examiner* — Badri Narayanan Champakesan
(74) *Attorney, Agent, or Firm* — Holtz, Holtz & Volek PC

(57) ABSTRACT

An authentication device includes a first login module and a second login module. Upon a login request to a first account among predetermined accounts which is accompanied by an entry of authentication information from a user, the first login module compares the entered authentication information with the authentication information associated with each of the predetermined accounts and approves the login request if the entered authentication information matches the authentication information on the first account. The second login module approves login of a second account if login to the second account is requested in a login session started by approval of the login request to the first account by the first login module. The second account has a pre-established proxy to approve the login request to the first account.

8 Claims, 8 Drawing Sheets

(51) Int. Cl.
*G06F 21/31* (2013.01)
*H04L 29/08* (2006.01)
*G06F 21/45* (2013.01)

(52) U.S. Cl.
CPC .......... *H04L 67/28* (2013.01); *H04L 63/0884* (2013.01); *H04L 63/10* (2013.01)

(58) Field of Classification Search
USPC ............................................................ 726/5
See application file for complete search history.

(56) References Cited

U.S. PATENT DOCUMENTS

| | | | | |
|---|---|---|---|---|
| 7,788,484 | B2* | 8/2010 | Paya | H04L 9/3271 |
| | | | | 380/277 |
| 8,086,635 | B1* | 12/2011 | Rinker | G06F 21/604 |
| | | | | 707/783 |
| 8,249,961 | B1* | 8/2012 | Hopkins | G06Q 20/227 |
| | | | | 235/380 |
| 8,631,478 | B2* | 1/2014 | Chen | H04L 63/0281 |
| | | | | 726/6 |
| 9,369,457 | B2* | 6/2016 | Grajek | H04L 63/0853 |
| 9,742,767 | B1* | 8/2017 | Li | H04L 63/0884 |
| 9,906,503 | B1 | 2/2018 | Thayer et al. | |
| 10,061,931 | B2* | 8/2018 | Uchikawa | H04N 1/00244 |
| 10,070,310 | B2* | 9/2018 | Powell | H04W 12/0023 |
| 10,250,584 | B2 | 4/2019 | Mikheev et al. | |
| 10,469,497 | B2 | 11/2019 | Yedidi et al. | |
| 2003/0088517 | A1* | 5/2003 | Medoff | G06Q 40/06 |
| | | | | 705/59 |
| 2004/0117615 | A1* | 6/2004 | O'Donnell | H04L 63/0823 |
| | | | | 713/155 |
| 2004/0128542 | A1* | 7/2004 | Blakley, III | H04L 63/0815 |
| | | | | 726/12 |
| 2007/0234417 | A1* | 10/2007 | Blakley, III | H04L 63/0815 |
| | | | | 726/12 |
| 2009/0164382 | A1 | 6/2009 | Sally | |
| 2010/0148922 | A1 | 6/2010 | Yamada et al. | |
| 2011/0154459 | A1* | 6/2011 | Kuang | G06F 21/577 |
| | | | | 726/6 |
| 2011/0182284 | A1 | 7/2011 | Lee et al. | |
| 2013/0152174 | A1* | 6/2013 | Raley | H04L 63/0823 |
| | | | | 726/4 |
| 2014/0020078 | A1* | 1/2014 | Canning | H04L 63/0815 |
| | | | | 726/8 |
| 2014/0245389 | A1* | 8/2014 | Oberheide | H04L 63/0884 |
| | | | | 726/3 |
| 2014/0341373 | A1 | 11/2014 | Song et al. | |
| 2015/0089610 | A1* | 3/2015 | DeSoto | H04L 63/08 |
| | | | | 726/6 |
| 2016/0300224 | A1* | 10/2016 | Liu | G06K 19/09112 |
| 2016/0366134 | A1 | 12/2016 | Hughes et al. | |
| 2017/0118029 | A1* | 4/2017 | Salmi | H04L 67/42 |
| 2018/0253544 | A1* | 9/2018 | Ohsumi | G06F 21/41 |

FOREIGN PATENT DOCUMENTS

| | | |
|---|---|---|
| JP | 2002222168 A | 8/2002 |
| JP | 2004013298 A | 1/2004 |
| JP | 2004288059 A | 10/2004 |
| JP | 2008003810 A | 1/2008 |

OTHER PUBLICATIONS

Japanese Office Action (and English language translation thereof) dated Nov. 26, 2019 issued in Japanese Application No. 2017-020875.
Office Action (Final Rejection) dated Mar. 3, 2020 issued in U.S. Appl. No. 15/879,687.
Notice of Allowance dated May 15, 2020 issued in related U.S. Appl. No. 15/879,687.
Halderman, "Privacy management for portable recording devices", WPES04: Proceedings of the 2004 ACM workshop on Privacy in the electronic society. pp. 16-24 (Year: 2004).
Tonelli, "Making readability indices readable", Proceedings of the First Workshop on Predicting and improving Text Readability for target reader populations. Jun. 2012, pp. 40-48 (Year: 2012).

* cited by examiner

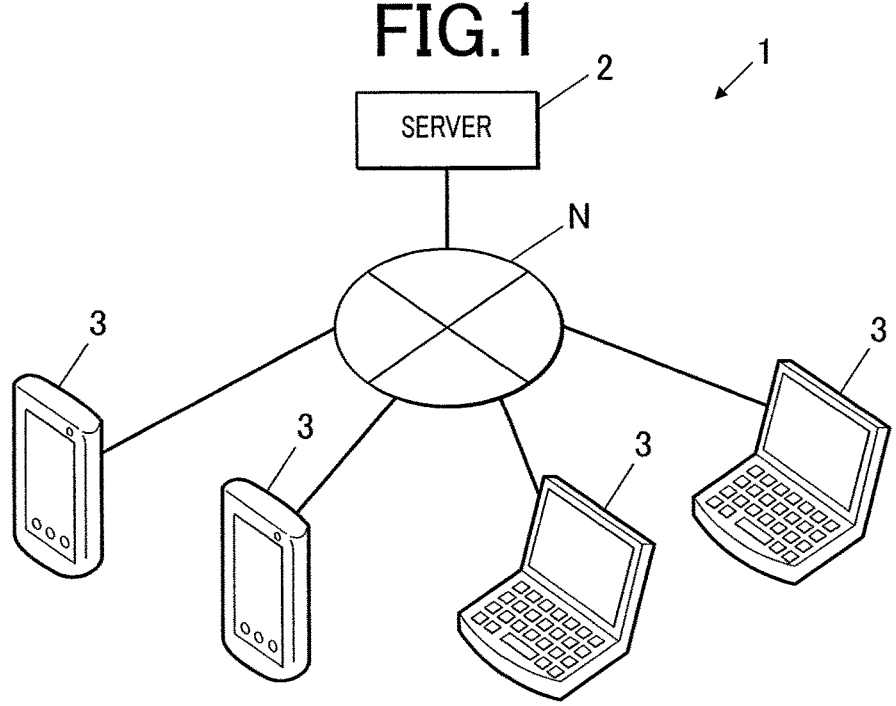
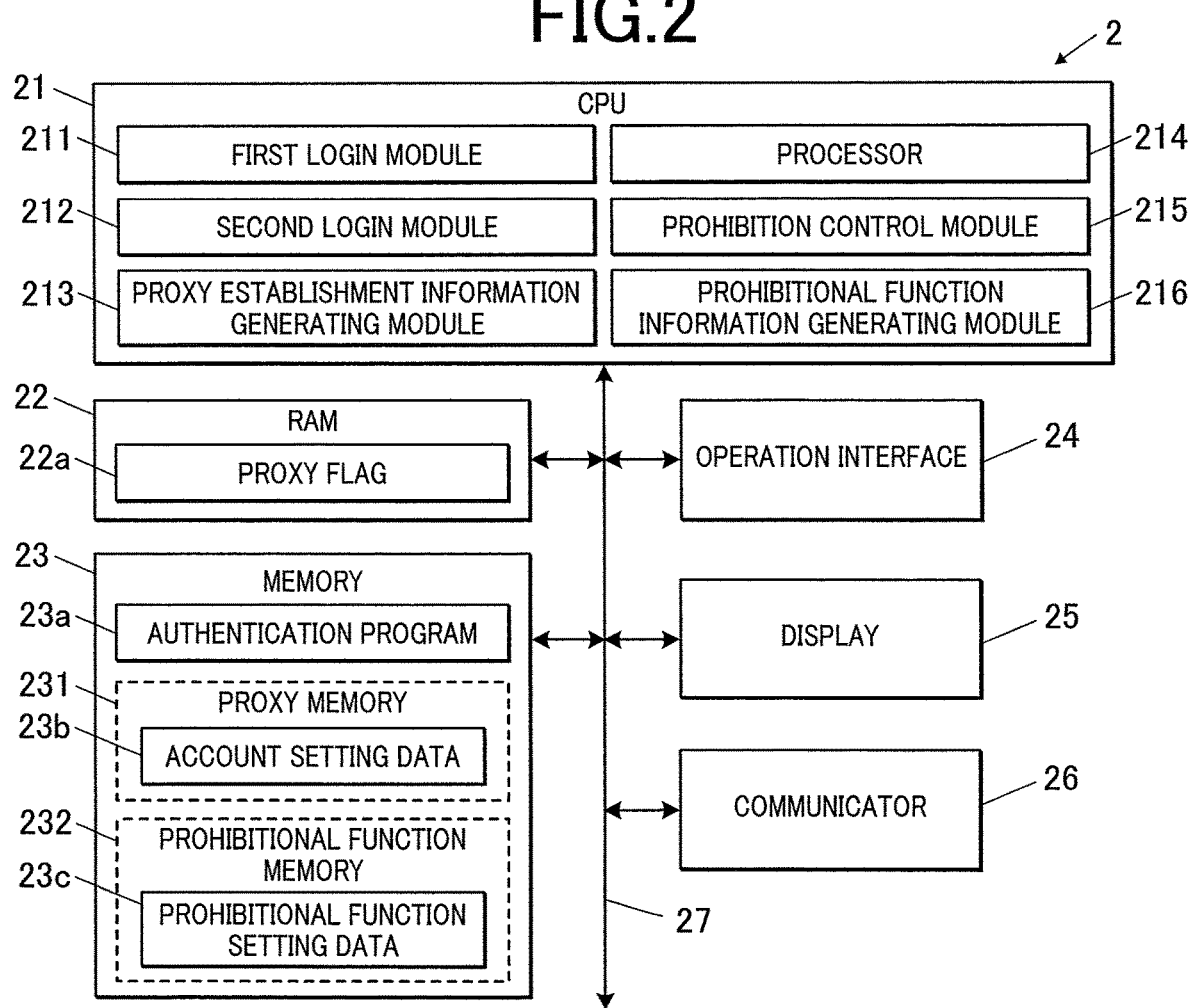

23b

| ACCOUNT(ID) | EMAIL ADDRESS | PROXY ESTABLISHMENT | DEPENDENT ACCOUNT | | | |
|---|---|---|---|---|---|---|
| 001 | ···@···.co.jp | YES | 014 | 035 | | |
| 002 | ···@···.com | NO | | | | |
| 003 | ···@···.co.jp | NO | | | | |
| 004 | ···@···.com | NO | | | | |
| 005 | ···@···.com | YES | 017 | 025 | 044 | 103 |
| 006 | ···@···.co.jp | NO | | | | |
| 007 | ···@···.co.jp | NO | | | | |
| 008 | ···@···.ac.jp | YES | 052 | | | |
| 009 | ···@···.co.jp | NO | | | | |
| 010 | ···@···.co.jp | NO | | | | |
| 011 | ···@···.com | YES | 018 | 021 | 022 | 024 |
| 012 | ···@···.co.jp | NO | | | | |
| 013 | ···@···.com | NO | | | | |
| 014 | ···@···.co.jp | NO | | | | |
| 015 | ···@···.co.jp | NO | | | | |
| 016 | ···@···.co.jp | NO | | | | |
| 017 | ···@···.co.jp | NO | | | | |

FIG.8

| FUNCTION ITEMS (ACCOUNTING) | TAX ATTORNEY A | TAX ATTORNEY B | TAX ATTORNEY C |
|---|---|---|---|
| ENTRY OF NEW TRANSACTION | ○ | ● | ○ |
| CORRECTION OF TRANSACTION | ○ | ● | ○ |
| GENERAL LEDGER | ○ | ○ | ○ |
| JOURNAL | ○ | ○ | ○ |
| CONSUMPTION TAX SUMMARY SHEET | ● | ○ | ○ |
| TRIAL BALANCE OF BALANCES | ● | ○ | ○ |
| CASH BOOK | ● | ○ | ○ |
| EXPENSE BOOK | ● | ○ | ○ |
| PAYABLE BOOK | ● | ○ | ○ |
| RECEIVABLE BOOK | ● | ○ | ○ |
| DEPOSIT ACCOUNT BOOK | ● | ○ | ○ |

DECIDE

AUTHENTICATION DEVICE AND COMPUTER-READABLE RECORDING MEDIUM

CROSS-REFERENCE TO RELATED APPLICATIONS

This application is based upon and claims the benefit of priority from the prior Japanese Patent Application No. 2017-020875, filed on Feb. 8, 2017, the entire contents of which are incorporated herein by reference.

BACKGROUND OF THE INVENTION

1. Field of the Invention

The present invention relates to an authentication device authenticating accounts and a computer-readable recording medium.

2. Description of the Related Art

Traditional systems store data related to various operations, for example, financial accounting, tax practice, and personnel in enterprises, such as the self-employed and corporations, from enterprise terminals into servers for management. A technique using such a system enables the joint management of the data on a server by both the authorized persons in the enterprise and specialists familiar with the operations (for example, tax attorneys, certified public accountants, and public consultants on social and labor insurance) and enables the specialists to compile the data (for example, prepare and update the data) to relieve the burdens of both the authorized persons and specialists managing the data (see, for example, Japanese Unexamined Patent Application Publications No. 2004-13298 and No. Hei-9-274628).

In such a technique, authentication devices are used that permit only the authorized persons and specific specialists having the authorization for data compilation from the enterprise to access the enterprise data. In detail, separate accounts providing the access to the enterprise data are issued for the authorized persons and the specialists authorized by the enterprise, and then each of the accounts is authenticated by the corresponding authentication device, thereby enabling only the authorized persons and the specialists to access the data.

SUMMARY OF THE INVENTION

To achieve at least one of the abovementioned objects, according to an aspect of the present invention, an authentication device includes:

a first login module which, upon a login request to a first account among predetermined accounts which is accompanied by an entry of authentication information from a user, compares the entered authentication information with the authentication information associated with each of the predetermined accounts and which approves the login request if the entered authentication information matches the authentication information on the first account; and a second login module which approves login of a second account if the first login module approves the login request to the first account and, in addition, login to the second account is requested in a login session started by approval of the login request to the first account by the first login module, wherein the second account has a pre-established proxy to approve the login request to the first account.

According to another aspect of the present invention, a non-transitory computer-readable recording medium stores a computer program causing a computer in an authentication device to execute:

a first login process of comparing, upon a login request to a first account among predetermined accounts which is accompanied by an entry of authentication information from a user, the entered authentication information with the authentication information associated with each of the predetermined accounts and approving the login request if the entered authentication information matches the authentication information on the first account; and a second login process of approving login of a second account if login to the second account is requested in a login session started by approval of the login request to the first account by the first login module, wherein the second account has a pre-established proxy to approve the login request to the first account.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a schematic block diagram of a management supporting system.

FIG. 2 is a block diagram illustrating the major functional configuration of a server.

FIG. 8 illustrates an example prohibitional function setting window for setting a prohibitional function.

DETAILED DESCRIPTION OF THE PREFERRED EMBODIMENTS

Figures 3, 4:
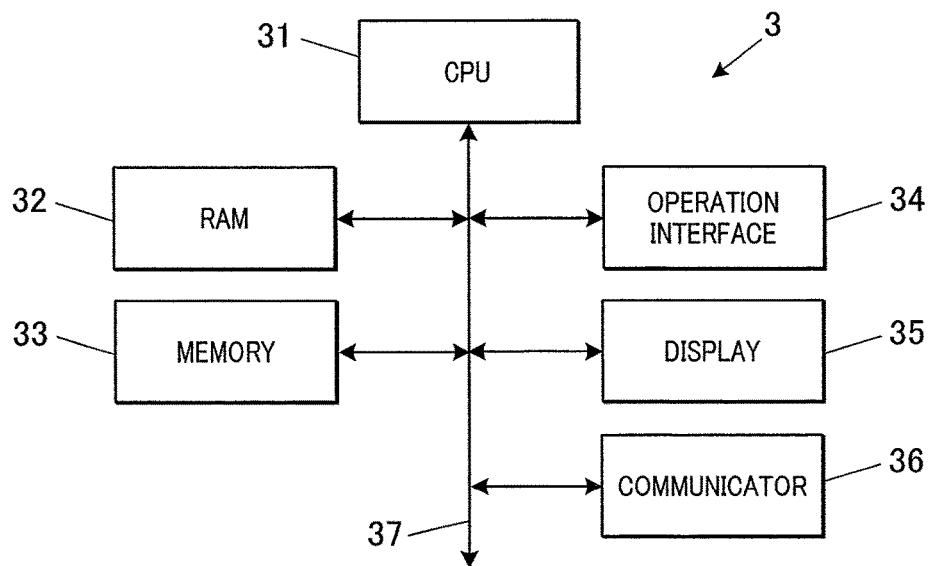
FIG. 3 is a block diagram illustrating the major functional configuration of a terminal.
FIG. 4 illustrates example account setting data in detail.

An embodiment of an authentication device and a computer-readable recording medium according to the present invention will now be described in reference to the accompanying drawings.

FIG. 1 is a schematic block diagram of a management supporting system 1 according to the embodiment.

The management supporting system 1 includes a server 2 (authentication device) and two or more terminals 3. The server 2 is connected with the terminals 3 through a communication network N. The management supporting system 1 stores various business data related to operations, for example, financial accounting, tax practice, and personnel in an enterprise, such as the self-employed and a corporation, into the server 2, to achieve a cloud service for supporting the business administration through joint management of the business data by authorized persons in the enterprise and specialists whom the enterprise entrusts with services (tax attorneys, certified public accountants, public consultants on social and labor insurance, and other consultants).

The server 2 stores and manages the business data received from the terminals 3 for each account. The server 2 authenticates a specific account to establish a login session upon request for login from the terminals 3. The server 2 executes various programs to support business administration after the login session and performs processes for achieving various functions related to, for example, preparation, update, and inspection of the business data. FIG. 1 illustrates the management supporting system 1 including a single server 2. Alternatively, the management supporting system 1 may include two or more servers 2.

The terminals 3 are placed at users managing a business or users involved with the business (hereinafter referred to as enterprise users) or to the specialists described above (hereinafter referred to as specialist users). The terminals 3 may be, for example, smartphones, tablet personal computers (PC), mobile phones, personal digital assistants (PDA), laptop PCs, and desktop PCs. The terminals 3 receive entries by user operations through software, such as a browser, to transmit them to the server 2 and displays the information from the server 2. The management supporting system 1 according to the present embodiment includes two or more terminals 3.

The communication network N is the Internet. Alternatively, the communication network N may include, for example, a local area network (LAN), a wide area network (WAN), telephone lines, dedicated lines, a mobile communication network, a communication satellite network, and cable television (CATV) lines.

FIG. 2 is a block diagram illustrating the major functional configuration of the server 2.

The server 2 includes, for example, a central processing unit (CPU) 21 including a first login module 211, a second login module 212, a proxy establishment information generating module 213, a processor 214, a prohibition controlling module 215, a prohibitional function information generating module 216, and a computer. The server 2 further includes a random access memory (RAM) 22 (identification information memory); a memory 23 including a proxy memory 231 and a prohibitional function memory 232; an operation interface 24; a display 25; and a communicator 26. These components of the server 2 are connected through a bus 27.

The CPU 21 reads various programs, such as system programs and application programs stored in the memory 23, to deploy them in the work area of the RAM 22 and controls the operations of each component of the server 2 under the instruction of the programs. For example, the CPU 21 executes an authentication program 23*a* among the programs to authenticate an account upon request from the terminals 3, thereby establishing the login session.

The RAM 22 is, for example, a volatile memory and serves as a work area for temporarily storing various programs or data read by the CPU 21.

The memory 23 includes a computer-readable recording medium, for example, a hard disk drive (HDD), a solid state drive (SSD), an electrically erasable programmable read only memory (EEPROM), and a flash memory.

The memory 23 stores various programs to be executed by the CPU 21 and various types of data, such as setting data. The programs includes not only the authentication program 23*a*, but also, for example, a To Do application program, an accounting application program, a salary application programs, a POP generation application program, and a sales aggregation management application program, which are not depicted. These programs are stored in the memory 23 in the form of computer-readable programming codes.

The proxy memory 231 in the memory 23 stores account setting data 23*b* (proxy establishment information) associated with account setting of the above-described setting data. The prohibitional function memory 232 in the memory 23 stores prohibitional function setting data 23*c* (prohibitional function information) associated with prohibitional function setting for each account, of the setting data. The details on the account setting data 23*b* and the prohibitional function setting data 23*c* and the method for generating these pieces of data will be described below. The memory 23 stores, for example, business data associated with user accounts and authentication data associated with information (ID, email address, and password) used for login authentication of each account.

The operation interface 24 includes, for example, a key entry unit, such as a key board, and a pointing device, such as a mouse. The operation interface 24 receives entries from the key entry unit (key entries) and entries from the pointing device (position entries) and outputs operational information from the entry operations to the CPU 21.

The display 25 includes, for example, a liquid crystal display (LCD) or an organic electro-luminescent (EL) display. The display 25 presents, for example, the operational status of the server 2 and entries through the operation interface 24 on the screen in response to control signals output by the CPU 21.

The communicator 26 includes, for example, a network card, a modem, a terminal adapter (TA), and a router. The communicator 26 is connected with external devices, such as the terminals 3, through the communication network N to transmit and receive data.

FIG. 3 is a block diagram illustrating the major functional configuration of the terminals 3.

The terminals 3 each include, for example, a CPU 31, a RAM 32, a memory 33, an operation interface 34, a display 35, and a communicator 36. These components of the terminals 3 are connected with one another through a bus 37.

The CPU 31 reads various programs, such as system programs and application programs stored in the memory 33, to deploy them in the work area of the RAM 32 and controls operations of each component of the terminals 3 under the instruction of the programs. For example, the CPU 31 executes information display/input programs, such as browsers, to cause the communicator 36 to transmit information to the server 2 in response to entries to the operation interface 34 by user operations and cause the display 35 to present the information received from the server 2.

The RAM 32 is, for example, a volatile memory and serves as a work area for temporarily storing various programs and data read by the CPU 31.

The memory 33 includes, for example, a HDD, a SSD, an EEPROM, and a flash memory. The memory 33 stores various types of data, such as programs to be executed by the CPU 31 and setting data.

The programs include information display/input programs, such as browsers.

The operation interface 34 includes, for example, a key entry unit, such as a key board, a pointing device such as a mouse, and a touch panel on the screen of the display 35. Examples of the touch panel include electrostatic capacitive panels detecting touches in response to a change in electrostatic capacitance between an internal conductive film and the panel through touches by fingers. Further examples include panels of resistive types and electromagnetic induction types. The operation interface 34 receives entries from the key entry unit (key entries) and entries from the pointing device and touch panel (position entries) and outputs the operational information from the entry operations to the CPU 31.

The display 35 includes, for example, an LCD or an organic EL display. The display 35 presents, for example, the results of processes of application programs executed by the server 2 or entries by the operation interface 34 (for example, in the application window of a browser) on the screen in response to control signals from the CPU 31.

The communicator 36 includes, for example, a network card, a modem, a TA, and a router. Alternatively, the communicator 36 may include, for example, an antenna, a modulation/demodulation circuit, and a signal processing circuit for wireless communication. The communicator 36 is connected with external devices, such as the server 2, through the communication network N to transmit and receive data.

The operation of the management supporting system 1 will now be described.

<Overall Operation and Operation Related to Proxy Establishment>

In the management supporting system 1 according to the present embodiment, accounts are generated for enterprise users and specialist users, and the information on the accounts are stored in the account setting data 23b. The enterprise and specialist users can enter authentication information associated with their own accounts on the terminals 3 and transmit the information to the server 2 to log into the management supporting system 1. The users can thereby access, for example, the business data associated with the accounts on the server 2 in the initiated login session. In detail, the users can perform entries on the terminals 3 to cause the server 2 to execute a predetermined application program and thereby generate, update, and inspect the business data associated with the accounts for which the login has been performed. Hereinafter, the login accompanied by entry of the authentication information will also be referred to as "first login". In the management supporting system 1 according to the present embodiment, the authentication information includes a combination of an ID and a password or a combination of an email address and a password.

The management supporting system 1 according to the embodiment can set a specific specialist user to a proxy and allow him/her to log into an enterprise user account. If the first login is performed to a specialist user account for which a proxy has been established (hereinafter referred to as a proxy account (first account)), this login session enables further login (proxy login) to the enterprise user account entitling the specialist user to the proxy right (hereinafter referred to as a dependent account (second account)), thereby allowing the proxy account to access the data associated with the dependent account. Hereinafter, the login to the dependent account in the login session by the proxy will be referred to as "second login". The second login does not require entry of authentication information associated with the dependent account. Thus, the specialist user does not need to know the authentication information of the dependent account or to have a separate account to access the dependent account. After the first login by the proxy account, the specialist user can perform the second login to the dependent account to readily access the business data for the dependent account.

A proxy is established by association of the specialist user account with the enterprise user account in the account setting data 23b.

FIG. 4 illustrates example account setting data 23b in detail. The account setting data 23b includes accounts and data items "email address", "proxy establishment", and "dependent account" associated with the accounts.

In FIG. 4, the item "ID" consisting of three digits identifies an account. However, any other manner of identification may be used. For example, the ID may consist of a string, which may be entered by a user.

The item "email address" is unique to each of the accounts and may include a portion of the authentication information. The email address is set, for example, by user entry when an account is generated.

The item "proxy establishment" indicates whether a proxy is established for an account, namely whether the account is a proxy account. In FIG. 4, whether a proxy is established is indicated by "yes" or "no". This is represented by one bit in the actual account setting data 23b.

The item "dependent account" indicates whether an account has a proxy, that is, whether the account is a dependent account. In FIG. 4, for example, the proxy account having an ID "001" is assigned with two dependent accounts with IDs "014" and "035". In this manner, two or more dependent accounts may be assigned to a single proxy account.

It should be noted that the account setting data 23b may include any item that is not indicated in FIG. 4. The account setting data 23b may include, for example, items indicating passwords associated with accounts or items indicating proxy accounts assigned with dependent accounts.

A proxy is established in the account setting data 23b as follows. An enterprise user performs the first login with his/her own account to initiate a login session. The enterprise user enters the email address of a specialist user of interest on a predetermined entry form, and then establishment of the proxy starts.

If the entered email address matches any of the unique email addresses associated with the existing accounts, email for acceptance of proxy establishment is transmitted to the specialist user at the entered email address and prompts him/her to accept setting of his/her account corresponding to the entered email address to a proxy of the enterprise user account. The email for acceptance includes the URL of a website for accepting the established proxy (appearing on a control window). If the specialist user accesses the website and performs a predetermined entry and accept the proxy establishment, the account corresponding to the entered email address (proxy account) is associated with the enterprise user account as a dependent account in the account setting data 23b.

If the entered email address matches none of the unique email addresses associated with the existing accounts, email for invitation to proxy establishment including the URL of a website for generating an account (appearing on the control window) is transmitted to the specialist user at the entered email address to generate a new account. The email for invitation includes the description prompting the specialist user to accept generation of an account in the management supporting system 1 and setting of the generated account to a proxy of the enterprise user account. If the specialist user accepts the invitation, performs a predetermined entry at the website, and generates a new account, the new account (proxy account) is added to the account setting data 23b and associated with the enterprise user account as the dependent account.

Such requests for acceptance or invitation as described above for setting a specialist account to a proxy account will be hereinafter referred to as "proxy invitation".

The requests for acceptance and invitation also enable a specialist user having an account to set his/her own account to a proxy account of the enterprise user and associate the proxy account with the enterprise user account. Hereinafter, such requests for acceptance or invitation to setting another account to a dependent account will be referred to as "invitation to dependence".

The proxy establishment according to the present embodiment cannot set an existing proxy account to a dependent account (through an invitation to proxy from the proxy account or through an invitation to dependence to a proxy account) and cannot set an existing dependent account to a proxy account (through invitation to dependence from the dependent account or through invitation to proxy to the dependent account). This prevents the establishment of proxies, such as multi-tiered proxies and mutual proxies. In order to prohibit such proxy establishment, if the account performing the first login is a proxy account, only the entry form for email addresses of enterprise users to be invited (entry form for invitation of enterprise users) is displayed. If the account performing the first login is a dependent account, only the entry form for email addresses of specialist users to be invited (entry form for invitation of specialist users) is displayed.

Alternatively, if the proxy establishment is prohibited between the account performing the first login and the account corresponding to the email address entered on the entry form, a predetermined error message may be displayed.

It should be noted that the emails for acceptance or invitation may include, instead of the URL of the website, other pieces of information related on, for example, the control window on which proxy establishment is accepted or an account is generated (for example, the procedures for accepting an established proxy and for generating an account in the management supporting system 1 or a pass code necessary for acceptance of the established proxy and generation of the account).

<Operation for the First Login>

Figure 5:
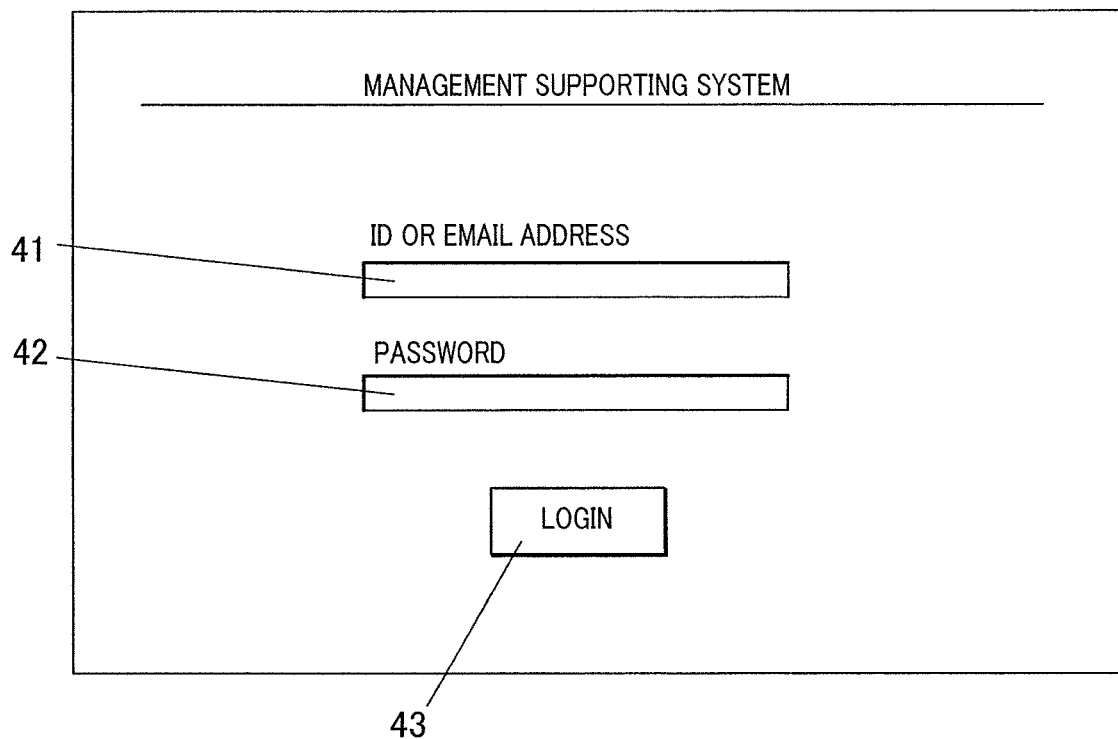
FIG. 5 illustrates an example login window for a first login.

FIG. 5 illustrates an example login window 40 for performing the first login.

The login window 40 appears on the display 35 if a browser program is executed on any of the terminals 3 and a predetermined website is accessed to perform the first login to the management supporting system 1. The login window 40 includes a text box 41 into which the ID or email address of an account is entered, a text box 42 into which a password is entered, and a login button 43.

The operation interface 34 of the terminal 3 sends the entry of an ID or email address to the text box 41 and the entry of a password to the text box 42. If the login button 43 is subsequently selected, the entered authentication information is transmitted to the server 2 and compared with the authentication information stored in the memory 23 of the server 2. If the entered authentication information matches the authentication information corresponding to any of the accounts in the memory 23 (i.e., if the entered authentication information is determined to be correct), the CPU 21 of the server 2 processes the entry as the first login with the account (hereinafter, referred to as the first login process). In the first login process, a session ID specific to the login to an account is generated and stored into the RAM 22 (or the memory 23) of the server 2, and the session ID is transmitted to the terminal 3 on which the login has been performed to establish the login session. When the terminal 3 accesses the server 2, the session ID is transmitted. The server 2 in turn compares the received session ID with the stored one and determines the login session established between the terminal 3 and the server 2 to transmit data to the terminal 3.

<Operations with the Account of an Enterprise User>

Figure 6:
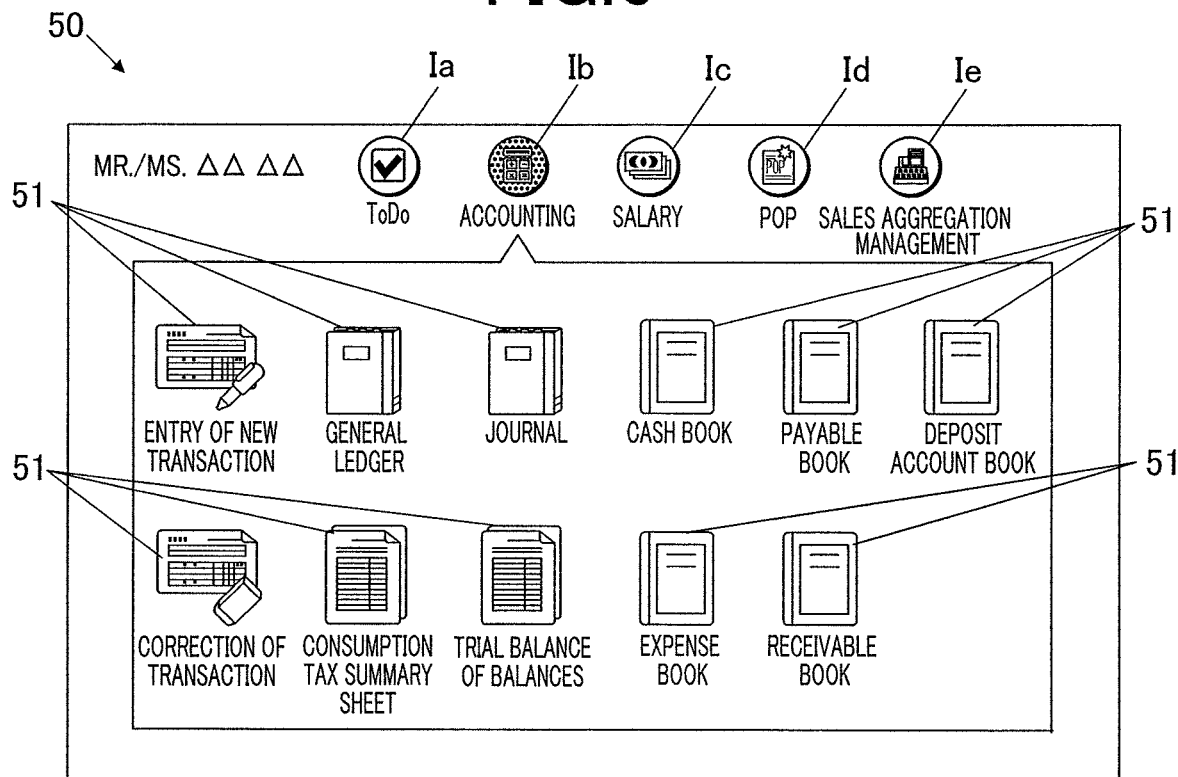
FIG. 6 illustrates an example enterprise window.

FIG. 6 illustrates an enterprise window 50 appearing on the display 35 of the terminal 3 when the first login is performed with an enterprise user account.

The enterprise window 50 includes a menu bar presented on the top. The menu bar includes an icon Ia to activate the To Do application program described above, an icon Ib to activate the accounting application program, an icon Ic to activate the salary application program, an icon Id to activate the POP generation application program, and an icon Ie to activate the sales aggregation management application program.

If any of the icons on the menu bar is selected by user clicking or touching, the enterprise window 50 can transit to a predetermined process window corresponding to the application of the selected icon.

The To Do application program generates and registers To Do tasks in a task database stored in the memory 23 and displays the To Do tasks.

The accounting application program is used for, for example, processes for journalizing of transactions, processes for asset management, and processes for tax payment based on the accounting information included in the business data.

The salary application program is used for process for calculation of salaries of employees based on the salary information included in the business data.

The POP generation application program generates a point of purchase advertising (POP) as an advertisement medium for sales promotion used in, for example, shops.

The sales aggregation management application program aggregates and analyzes the daily and monthly sales of shops based on the sales information included in the business data.

FIG. 6 illustrates the icon Ib being selected and the accounting application program being executed. If the accounting application program is executed, the enterprise window 50 presents two or more function icons 51 performing processes related to various functions (functional processes). In detail, the function icons 51 correspond to functions, for example, entry and correction of transactions, inspection and compilation of general ledgers and journals, generation and inspection of consumption tax summary sheets and the trial balance of balances, and inspection and compilation of cash books, expense books, payable books, receivable books, and deposit account books. If a user selects any of the function icons 51 by a click or touch, the functional process corresponding to the selected function icon 51 are performed, and the enterprise window 50 transits to the display of the functional process.

<Operation of the Specialist User Account and Operation of the Second Login>

Figure 7:
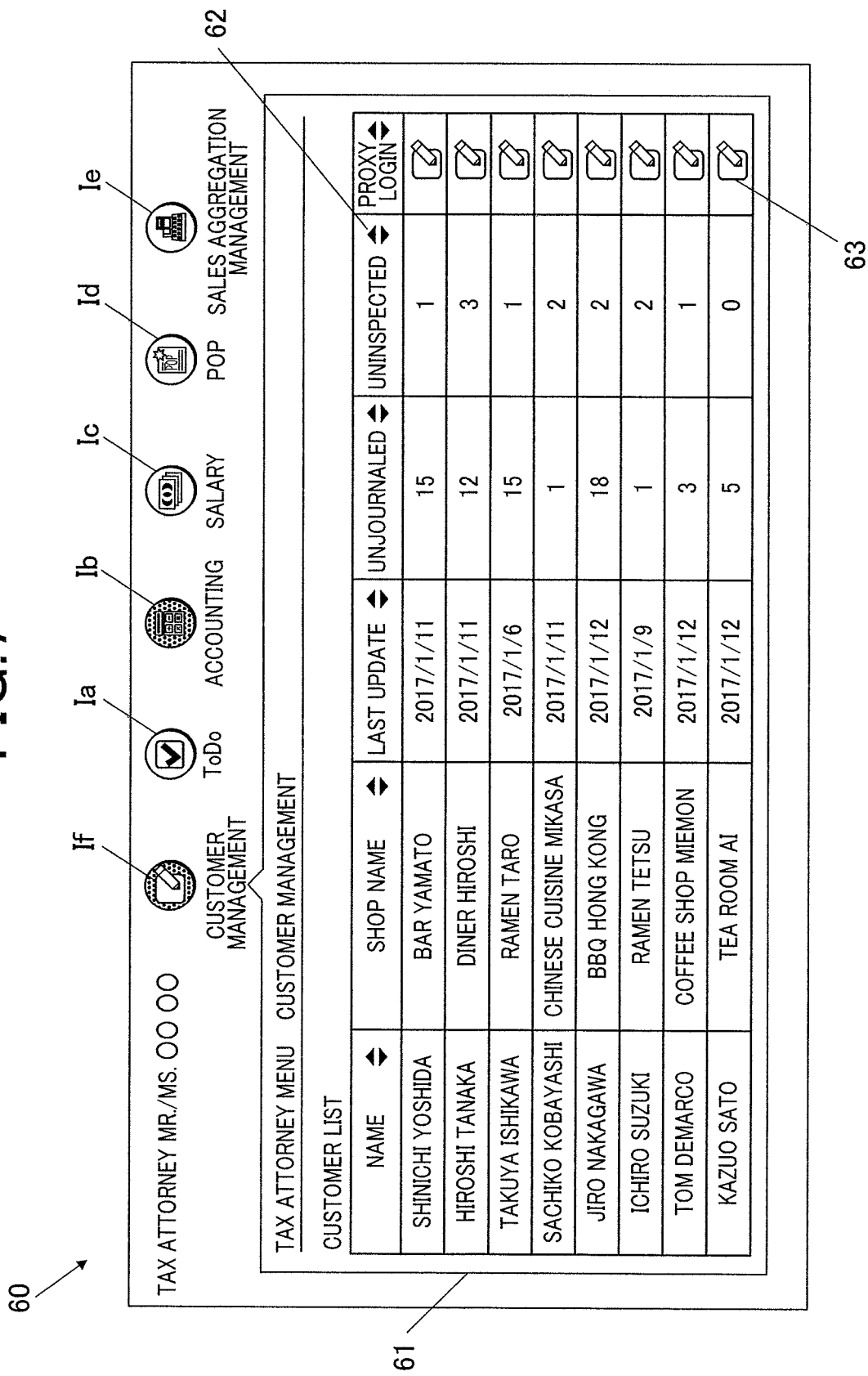
FIG. 7 illustrates an example specialist window.

FIG. 7 illustrates an example specialist window 60 presented on the display 35 of the terminal 3 for the first login performed by the proxy established for the specialist user account.

The specialist window 60 presents a list including information on dependent accounts that is set for the proxy accounts which have been logged in. FIG. 7 also illustrates an example customer management window 61 presented on the specialist window 60. The customer management window 61 includes listed information on the enterprise users corresponding to the dependent accounts.

The specialist window 60 presents a menu bar including the same icons Ia to Ieas those of the enterprise window 50 and an additional icon If causing the customer management window 61 to be displayed, on the top of the window. On the specialist window 60, any one of the icons Ia to Ie can be selected and various application programs, such as the accounting application program, can be executed. While the application program is displayed, selection of the icon If enables transit to the customer management window 61.

On the specialist window 60, the customer management window 61 presents the items of enterprise users corresponding to dependent accounts, such as user name, shop name, last update time of the business data, the number of unjournaled transactions, the number of transactions that have not been inspected by a specialist user, and a proxy login icon 63 to perform the proxy login to the dependent accounts. On the customer management window 61, a sort icon 62 in the columns of the items can be selected to sort the data.

On the customer management window 61, if the specialist user selects the proxy login icons 63 corresponding to specific dependent accounts by click or touch, the second login is performed to log into the dependent accounts without entry of the authentication information. If the second login is performed, the enterprise window 50 in FIG. 6 is presented for the dependent accounts to which the second login has been performed. Activation of various application programs from the presented menu bar on the enterprise window 50 enables the specialist user to inspect and compile the business data of the enterprise users corresponding to the dependent accounts. In this manner, the specialist user performs the first login to his/her own proxy account, and then the specialist user selects the proxy login icon 63 and performs the second login to the dependent accounts of the enterprise users of customers to be readily accessible to the business data of the enterprise users.

<Operation Related to Prohibitional Function Setting>

The enterprise users sometimes do not wish to allow the specialist users to inspect or compile a portion of the business data. The enterprise users may also wish to permit different specialists to access different portions of the business data. For the specialist users, a comprehensive authority to access all pieces of the business data of the enterprise users may result in difficulties with finding the portion to be inspected and corrected from the business data.

Thus, the management supporting system 1 according to the present embodiment provides a prohibitional function setting that prevents the specialist users after performing the second login to the dependent accounts of the enterprise users of customers from performing functional processes using predetermined functions. The enterprise users sets prohibitional functions in the login session after the first login to their own dependent accounts.

FIG. 8 illustrates an example prohibitional function setting window 70 for setting prohibitional functions. The prohibitional function setting window 70 is presented on the display 35 of the terminal 3 when a predetermined entry is performed that instructs to set prohibitional functions in the session started by the first login to a dependent account.

The prohibitional function setting window 70 indicates two or more vertically listed functions of interest in prohibitional function setting (example functions related to the accounting application program above in FIG. 8) and the names of specialist users horizontally listed and corresponding to proxy accounts of interest having proxies established by dependent accounts (tax attorneys A, B, and C in the example of FIG. 8). Each of the functions is provided with radio buttons 71 selecting the specialist users to be allowed to execute the functions. Enterprise users select any of the radio buttons 71 according to the functions and select the specialist users to be allowed to execute the functions. The enterprise users can thereby prohibit the specialist users who have not been selected from executing the functions. For example, in FIG. 8, the functions "enter new transaction" and "correct transaction" are available only to the tax attorney B, while this functions cannot be executed by the tax attorneys A and C. The functions "general ledger" and "journal" are prohibited from being performed by any of the tax attorneys A, B, and C. The functions "consumption tax summary sheet" and therebelow can be executed by the tax attorney A, whereas these functions are not available to the tax attorneys B and C.

If the decision button 72 is clicked after any of the radio buttons 71 according to the functions is selected, the prohibitional function setting data 23c that has reflected the selection of the radio buttons 71 is generated (or overwritten if generated in the past) and is stored in the memory 23 (prohibitional function memory 232) of the server 2.

Besides the accounting application program, the To Do application program, the salary application program, the POP generation application program, and sales aggregation management application program can also be set for the prohibitional functions on the prohibitional function setting window 70 of FIG. 8.

In the present embodiment, the application programs themselves can be set for the prohibitional functions, in addition to prohibitional function setting of individual functions of interest in the application programs.

In the management supporting system 1 according to the embodiment, if the prohibitional functions have been set, the second login to a dependent account is performed in the session started by the first login to a proxy account. A predetermined proxy flag (identification information) is then turned on, which operation indicates the second login through the first login to the proxy account. The proxy flag is one bit data stored in the RAM 22 of the server 2, and for example, one bit in the data representing a session ID is assigned to the proxy flag. It should be noted that the proxy flag may be data independent of the session ID.

Figure 9A:
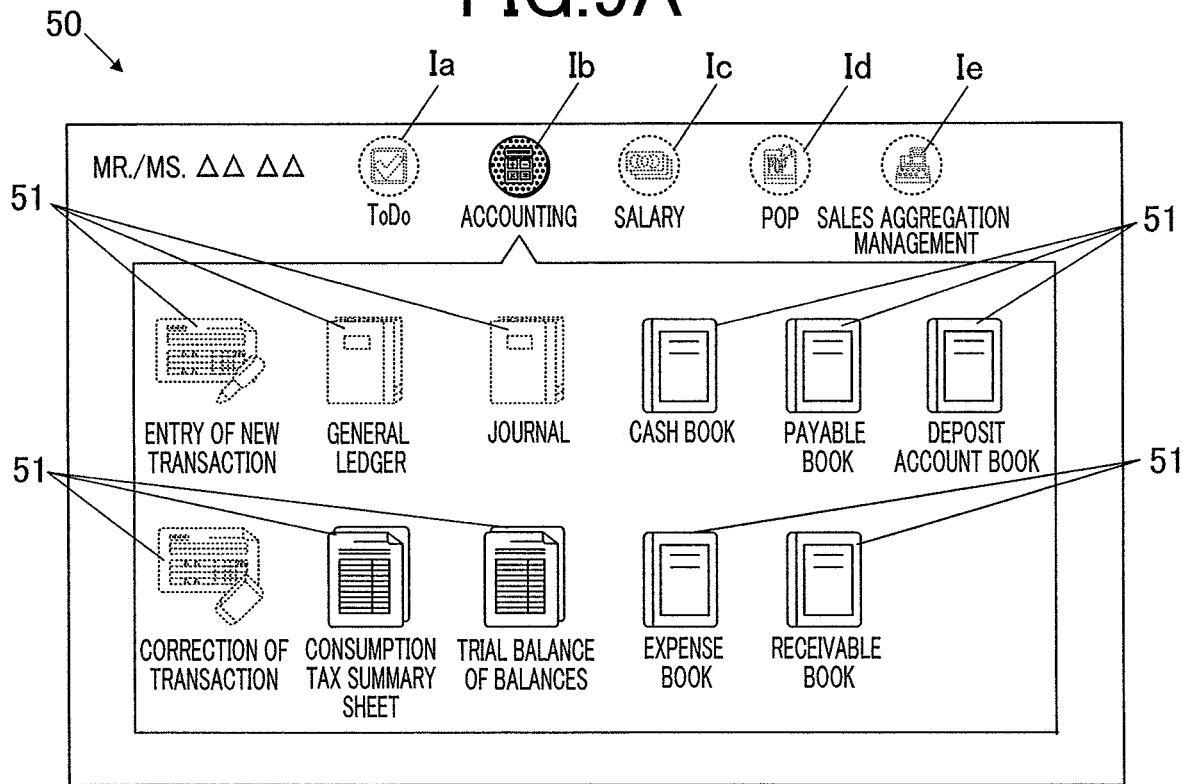
FIGS. 9A and 9B illustrate another example enterprise window.
Figure 9B:
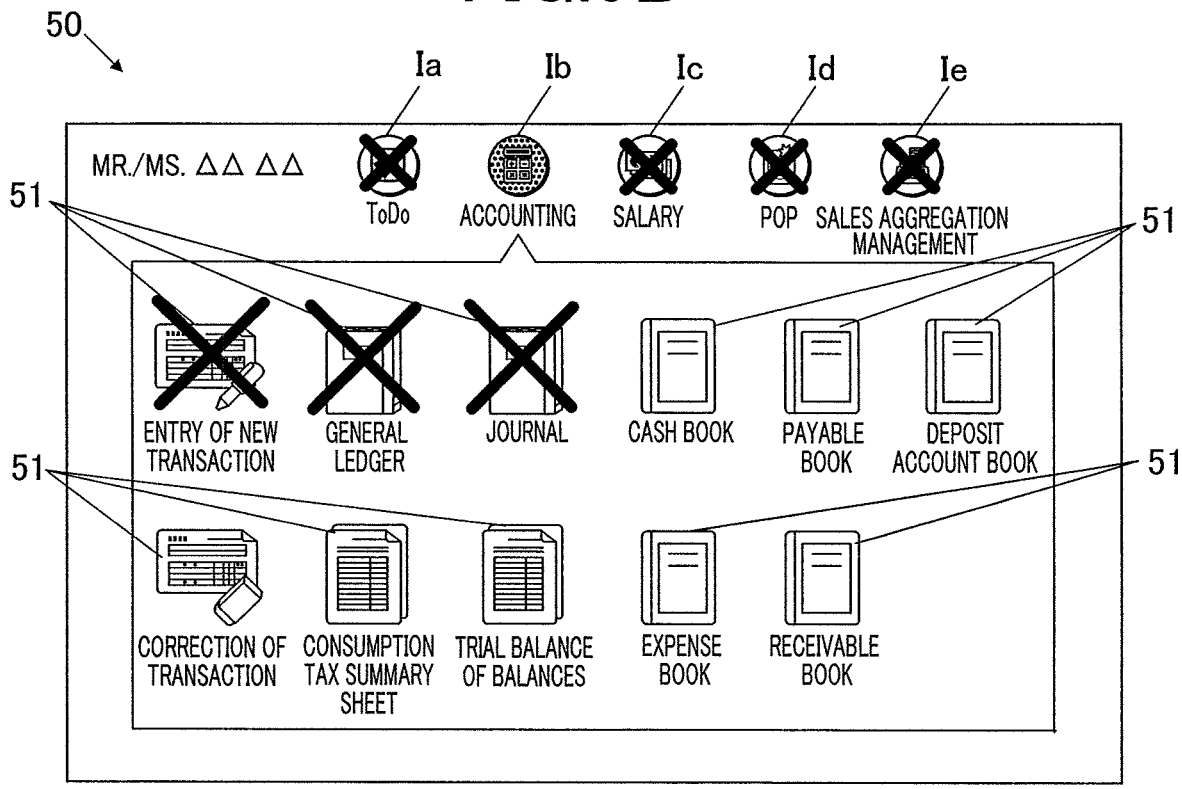

In the session started by the second login where the proxy flag is turned on, the functions and applications are identified for the dependent accounts performing the second login based on the prohibitional function setting data 23c. In this case, the proxy account is prohibited from executing the functions, and the functional processes related to the functions are not performed. In the case of the functions and the applications prohibited for execution, the mode of display and the setting of operation are modified depending on the setting of prohibitional functions. For example, as illustrated in FIG. 9A, the function icons 51 having the functions prohibited for execution and the icons for applications prohibited for execution (the icons Ia, Ic, Id, and Ie in this context) are caused to be translucent. In FIG. 9B, the function icons 51 having the functions prohibited for execution and the other icons for applications prohibited for execution are cross-marked such that the prohibitional functions can be recognized on the enterprise window 50. The entries to the function icons 51 and the other icons for applications related to the prohibitional functions are thereby disabled. The function icons 51 and the icons for applications related to the prohibitional functions may be hidden.

<Control Procedures for Operations>

The control procedures of causing the management supporting system 1 to perform various operations through the CPU 21 will now be described.

Figure 10:
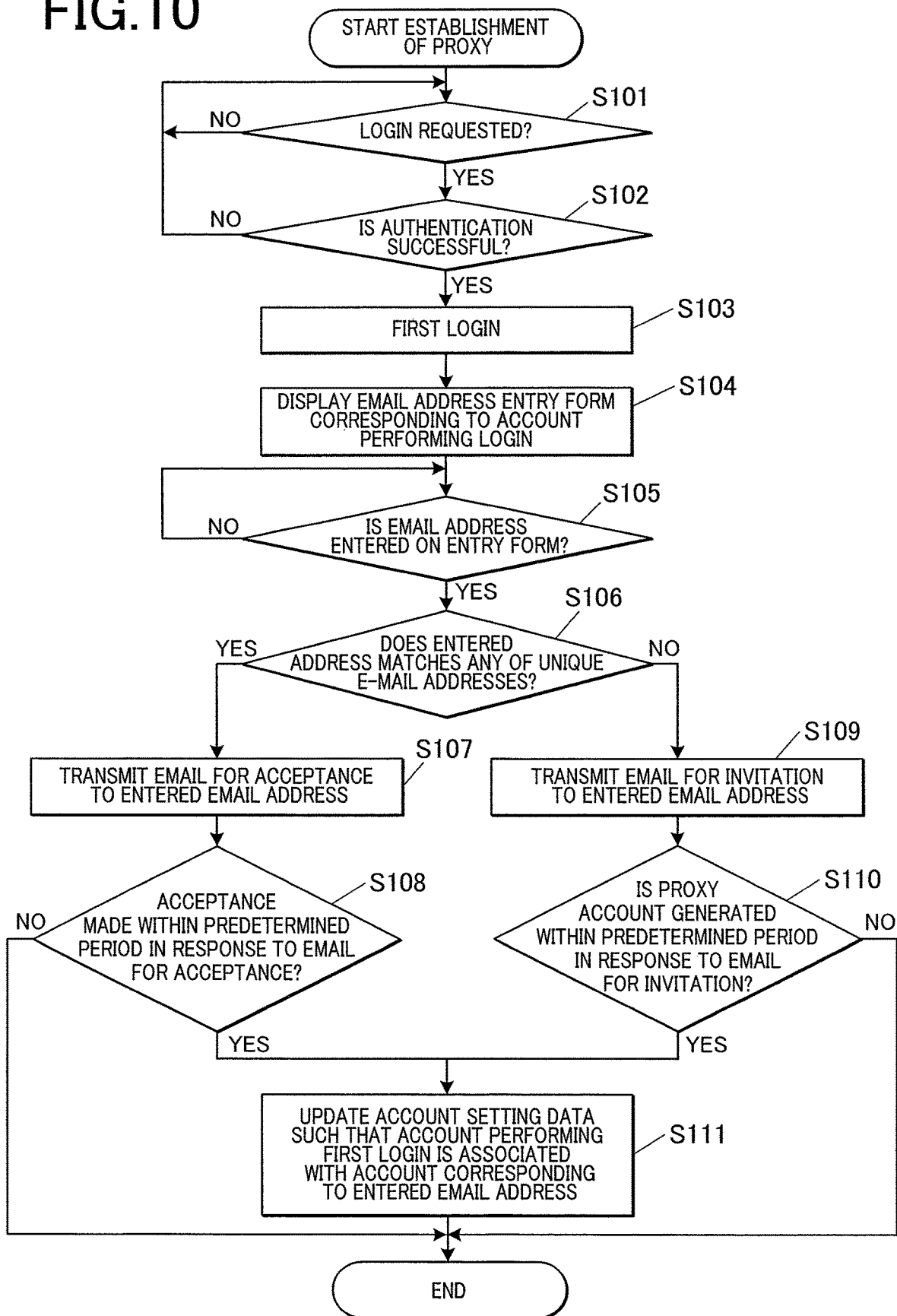
FIG. 10 is a flowchart illustrating procedures of proxy establishment by a CPU.

The control procedures of setting a proxy and reflecting the setting in the account setting data 23*b* will be described. FIG. 10 is a flowchart illustrating the control procedures of setting the proxy through the CPU 21.

In the proxy establishment, the CPU 21 checks for a login request accompanied by entry of authentication information on the login window 40 appearing on the display 35 of the terminal 3 (Step S101). If the login is not requested ("NO" in Step S101), the CPU 21 repeats Step S101.

If the login is requested ("YES" in Step S101), the CPU 21 determines whether the entered authentication information is successfully authenticated (Step S102). In this case, if the entered authentication information matches the authentication information on any of the accounts stored in the memory 23, the CPU 21 determines that the entered authentication information is authenticated. If the authentication of the entered authentication information fails ("NO" in Step S102), the step returns to Step S101. If the authentication is successful ("YES" in Step S102), the first login to the account indicated by the entered authentication information is performed (Step S103). In the first login, the CPU 21 generates a session ID specific to the login and transmits the session ID to the terminal 3.

The CPU 21 causes the terminal 3 to display a predetermined entry form for establishing the proxy depending on the types of account performing the first login (Step S104). In other words, if the account performing the first login is set to a proxy account, the CPU 21 causes the entry form for invitation of enterprise users to be displayed in reference to the account setting data 23*b*. If the account performing the first login is set to a dependent account, the CPU 21 causes the entry form for invitation of specialist users to be displayed. In other cases, the CPU 21 causes the entry forms for invitation of both enterprise users and specialist users to be displayed.

The CPU 21 determines whether an email address is entered on the entry form (Step S105). If no email address is entered ("NO" in Step S105), the CPU 21 repeats Step S105. If an email address is entered ("YES" in Step S105), the CPU 21 determines whether the entered email address matches any of the unique email addresses in the account setting data 23*b* (Step S106).

If the entered email address matches any of the unique email addresses ("YES" in Step S106), the CPU 21 transmits the email for acceptance including the URL of the above-described website to the entered unique email address (Step S107).

The CPU 21 checks for the acceptance in the designated website within the period predetermined in the email (Step S108). If the acceptance has been made ("YES" in Step S108), the CPU 21 updates the account setting data 23*b* such that the authorized account is associated with the account performing the first login in Step S103 (Step S111). If the entry form with the entered email address in Step S105 is for invitation of specialist users, the CPU 21 associates a proxy account corresponding to the email address entered on the entry form with the enterprise user account as the dependent account for which the first login has been performed in Step S103. If the entry form with the email address entered in Step S105 is for invitation of enterprise users, the CPU 21 associates a dependent account corresponding to the email address entered on the entry form with the proxy account of the specialist user performing the first login in Step S103.

If none of the entered email addresses matches the unique email addresses in the account setting data 23*b* in Step S106 ("NO" in Step S106), the CPU 21 transmits the email for invitation including the URL of the website for generating an account to the entered email address to generate a new account (Step S109).

CPU 21 checks for the generation of an account in response to the email within the period predetermined in the email (Step S110). If the account is generated ("YES" in Step S110), the CPU 21 updates the account setting data 23*b* such that the generated account is associated with the account for which the first login has been performed in Step S103 (Step S111).

If the acceptance has not been made within the predetermined period ("NO" in Step S108), if no account has been generated within the predetermined period ("NO" in Step S110), or if Step S111 has been completed, the CPU 21 completes establishment of proxies.

Control procedures for starting login sessions through the first and second logins will now be described.

Figure 11:
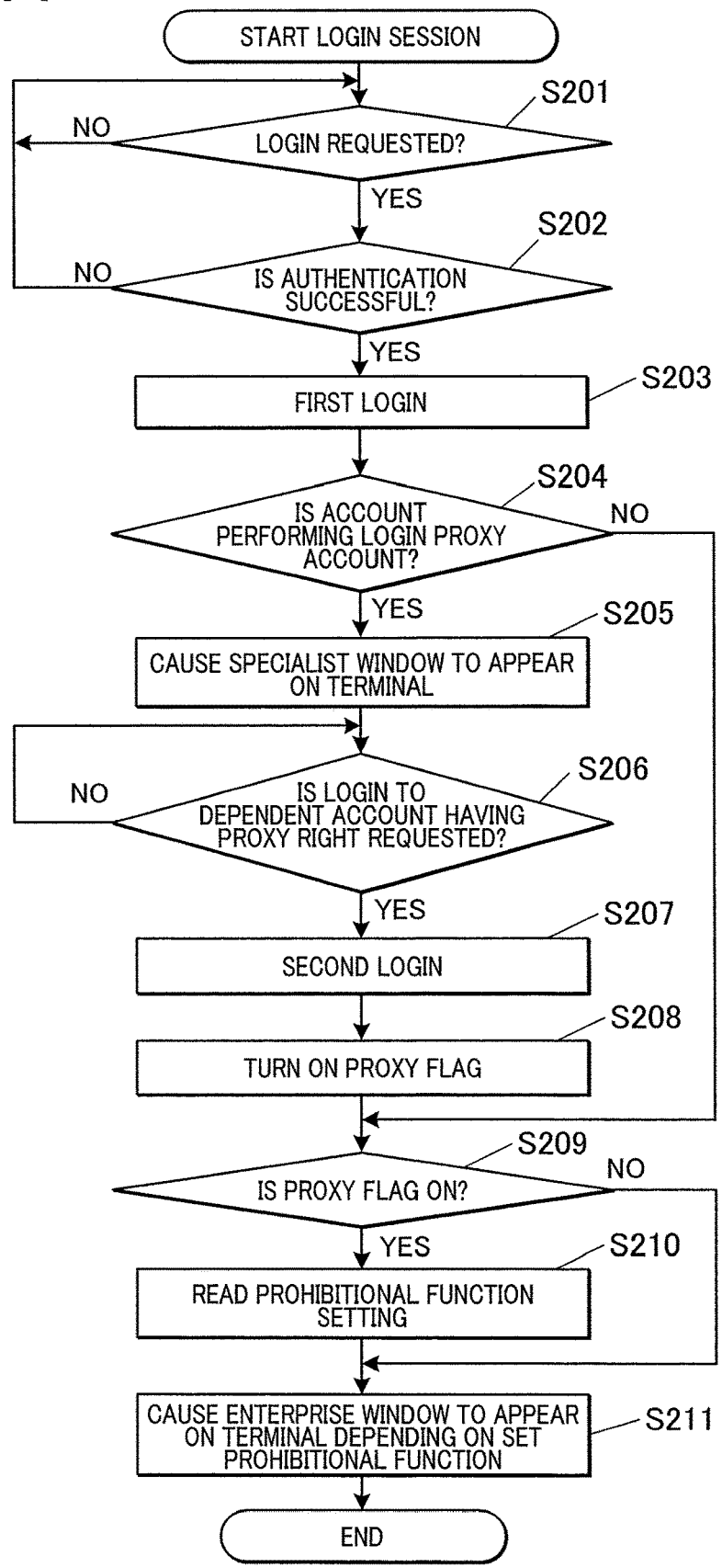
FIG. 11 is a flowchart illustrating procedures of start of a login session by the CPU.

FIG. 11 is a flowchart illustrating control procedures through the CPU 21 starting the login sessions.

At the start of the login sessions, the CPU 21 checks for the login request from the terminal 3 in Step S201 and checks for successful authentication of the entered authentication information in Step S202. If the entered authentication information is successfully authenticated, the CPU 21 approves the first login in Step S203. Since Steps S201 to S203 are the same as Steps S101 to S103 described above, description about these steps is omitted.

The CPU 21 determines whether the account performing the first login is a proxy account in reference to the account setting data 23*b* (Step S204). If the account is a proxy account ("YES" in Step S204), the CPU 21 causes the specialist window 60 of FIG. 7 to appear on the terminal 3 (Step S205).

The CPU 21 determines whether the login to a dependent account for which the proxy account has a proxy right has been requested, i.e., whether an entry has been made to select any of proxy login icons 63 on the specialist window 60 (Step S206). If no login is requested ("NO" in Step S206), Step S206 is repeated.

If the login to the dependent account for which the proxy account has a proxy right is requested ("YES" in Step S206), the CPU 21 approves the second login to the dependent account in response to the request and causes the login session to start (Step S207). The CPU 21 generates and transmits a session ID different from that generated in the first login in Step S203 to the terminal 3.

If the second login is performed, the CPU 21 turns on a proxy flag (Step S208). For example, the CPU 21 turns on the proxy flag assigned to one bit in the session ID generated in the second login.

If Step S208 is completed, or if the account performing the first login in Step S204 is not determined to be a proxy account ("NO" in Step S204), the CPU 21 checks for turning on of the proxy flag (Step S209). If the proxy flag is turned on ("YES" in Step S209), the CPU 21 reads the prohibitional function setting related to the functions prohibited for the proxy account performing the first login with reference to the prohibitional function setting data 23*c* in Step S203 (Step S210).

If Step S210 is completed, or if the proxy flag is turned off in Step S209 ("NO" in Step S209), the CPU 21 causes the enterprise window 50 to appear on the terminal 3 depending on the set prohibitional functions (Step S211). In other words, if the CPU 21 performs Step S211 after Step S210, the function icons 51 related to the prohibitional functions read in Step S210 are displayed translucently or hidden. Alternatively, the function icons 51 appears on the enterprise window 50 after disabling of the entry to the function icons 51. If the CPU 21 performs Step S211 without Step S210, the function icons 51 related to all the functions are set to appear and be selectable, and the enterprise window 50 is thereafter presented in Step S211.

After Step S211, the procedures end.

As described above, the server 2 in the management supporting system 1 according to the present embodiment serves as a device authenticating accounts. The server 2 includes the CPU 21. Upon a login request accompanied by an entry of authentication information from a user, the CPU 21 compares the entered authentication information with the authentication information associated with each of predetermined accounts. If the entered authentication information matches the authentication information on any of the accounts, the first login module 211 approves the login of the account. If the CPU 21 or the first login module 211 approves the login request to a proxy account among these accounts and if further login to a dependent account is requested in a login session started by the login to the proxy account, the second login module 212 approves the login request of the dependent account. The dependent account has a pre-established proxy to approve the login request to the proxy account.

Such a configuration enables the user having a proxy account to log into the dependent account associated with the proxy account without establishment of a separate account accessible to the dependent account. This can control an increase in accounts necessary for joint management of specific data between the dependent account and the proxy account. As a result, an increase in resources for management of accounts can be controlled, and the resources can be effectively utilized.

The server 2 includes the memory 23. The memory 23 (the proxy memory 231) stores the account setting data 23*b* for associating a specific proxy account of the accounts with one or more dependent accounts having a proxy established for the proxy account. The CPU 21 as the second login module 212 approves the login to the dependent account associated with the proxy account in the account setting data 23*b*. In such a configuration, the dependent account associated with the proxy account can be identified just in reference to the account setting data 23*b*, and whether to perform the second login can be thereby determined. Update of the account setting data 23*b* can readily modify setting of the dependent accounts permitted to perform the second login to the proxy account.

The CPU 21 (the proxy establishment information generating module 213) associates one account with another account and generates the account setting data 23*b* to be stored in the memory 23. The account is identified based on the information entered by a user in a login session started upon a login request to the other account by the approval of the first login module 211. One of the accounts is a proxy account, and the other is a dependent account. This enables a user having an account to select another account for establishing a proxy and to establish the proxy between the accounts.

Each of the accounts is associated with a unique email address. The CPU 21 (the proxy establishment information generating module 213) transmits email indicative of the URL of a specific website to the unique email address entered by the user in the login session for the second account to authorize a proxy established between an account corresponding to the unique email address and the second account and authorizes the proxy in the case of an entry for the authorization in the website. This allows proxy establishment through the request for acceptance and the consent thereto by the user having an account without involvement of the manager of the management supporting system 1.

The CPU 21 (the proxy establishment information generating module 213) transmits email indicative of the URL of a specific website for generation of an account to an email address entered by the user in the login session for the second account and establishes the proxy between the generated account and the second account in response to an entry in the website. This enables account generation and proxy establishment by request for acceptance and the consent thereto of users without involvement of the manager of the management supporting system 1 even if one of the users establishing the proxy does not have an account.

The CPU 21 (the second login module 212) approves the login request to the dependent account regardless of an entry of authentication information on the dependent account by the user. This allows the specialist user having a proxy account to readily log into the dependent account without knowledge of the authentication information on the dependent account.

The server 2 includes a RAM 22 for storing a proxy flag for identifying a first login session started by a login request approved by the CPU 21 as the first login module 211 and a second login session started by a login request approved by the CPU 21 as the second login module 212. The CPU 21 performs functional processes to achieve different functions in the first and second login sessions (through the processor 214) and prohibits a predetermined portion of the functional processes from being performed if the functional processes are performed in the second login session based on the proxy flag (through the prohibition control module 215). The second login to the dependent account by the specialist user having a proxy account can be thereby determined. The functions executable by the specialist user with the dependent account are thereby limited. The enterprise user can prevent the specialist user from inspecting or compiling a portion of his/her own business data. Since the functions executable by the specialist user are limited, the portion of the business data that should be checked for and updated by the specialist user can be clearly identified.

The memory 23 (the prohibitional function memory 232) stores the prohibitional function setting data 23*c* for identifying prohibitional functions in the functional processes for each account. The prohibitional functions are prohibited from being executed in the second login session. The CPU 21 (the prohibition control module 215) prohibits the prohibitional functions from being executed for an account in the established second login session based on the prohibitional function setting data 23*c*. This can achieve an operation reflecting individual prohibitional function settings for each account just in reference to the prohibitional function setting data 23*c*.

The CPU 21 (the prohibitional function information generating module 216) generates the prohibitional function setting data 23*c* corresponding to any of the accounts in response to an entry of information by a user in the first login session started for the account and stores the prohibitional function setting data 23*c* in the memory 23. In accordance with this configuration, since the account having the authorized authentication information for the first login sets the prohibitional function for the account, the failure due to unintentional settings of the prohibitional functions by other accounts can be reduced.

A computer-readable recording medium including the memory 23 according to the present embodiment is of a non-transitory type storing a computer program causing the CPU 21 (a computer) in the server 2 as an authentication device to execute the following procedures:

(i) the first login of comparing, upon a login request accompanied by an entry of authentication information from a user, the entered authentication information with the authentication information associated with each user account of accounts; and approving the login request to an account if the entered authentication information matches the authentication information on the user account; and (ii) the second login of approving a login request to a dependent account if the first login results in a login request to a proxy account of the accounts and if further login to the dependent account is requested in a login session started by the login request to the proxy account.

The dependent account has a pre-established proxy to approve the login to the proxy account. Such a program can control an increase in accounts necessary for joint management of specific data between the dependent account and the proxy account. This can control an increase in resources for account management, and the resources can be effectively utilized.

In the description above, the computer-readable medium according to the present invention is the memory 23, for example, a HDD. Alternatively, any other computer-readable medium, such as a hand-held recording medium, for example, a CD-ROM or a flash memory, may be used. The program data according to the invention can also be provided on carrier waves through communication lines.

It should be noted that the above description is directed at exemplary embodiments of the authentication device and the computer-readable recording medium according to the present invention and any other modification may be made. For example, the system that can use the authentication device according to the invention may include any system other than the management supporting system 1. In other words, the present invention may be applied to any system used by ordinary users and managers having proxies established by the ordinary users to be accessible to data.

While several embodiments according to the present invention are described herein, the embodiments should not be construed to limit the invention. The invention includes claimed scope and equivalents thereof.

What is claimed is:

1. An authentication device comprising:
a memory that stores account setting data in which a first account from among plural accounts is set as a proxy account for which a second account from among the plural accounts has a proxy, in which the second account is set as a dependent account that depends upon the proxy account, and in which each of plural unique email addresses is associated with a respective one of the plural accounts; and
a processor configured to execute processes comprising:
a first login process of, upon receipt of a login request which is accompanied by an entry of authentication information from a user, comparing the entered authentication information with authentication information associated with each of the plural accounts and approving the login request in a case in which it is determined that the entered authentication information matches authentication information of one of the plural accounts;
a second login process of approving login of the dependent account in a case in which login to the dependent account is requested in a login session started by approval of the login request received in the first login process; and
a registration process of, in a case in which an email indicative of information on a specific control window is transmitted as a proxy invitation to a unique email address entered by the user in the login session started by approval of the login request received in the first login process, the specific control window being a window for authorization to associate an account corresponding to the login session with an account corresponding to the unique email address entered by the user, and an operation for the authorization is performed in the specific control window, generating the account setting data in which the account corresponding to the login session is set as a dependent account and the account corresponding to the unique email address entered by the user is set as a proxy account, and registering the generated account setting data in the memory.

2. The authentication device according to claim 1, wherein the login request to the dependent account is approved regardless of entry of authentication information on the dependent account by the user.

3. An authentication device comprising:
a memory that stores account setting data in which a first account from among plural accounts is set as a proxy account for which a second account from among the plural accounts has a proxy, and in which the second account is set as a dependent account that depends upon the proxy account; and
a processor configured to execute processes comprising:
a first login process of, upon receipt of a login request which is accompanied by an entry of authentication information from a user, comparing the entered authentication information with authentication information associated with each of the plural accounts and approving the login request in a ease in which it is determined that the entered authentication information matches authentication information of one of the plural accounts;
a second login process of approving login of the dependent account in a case in which login to the dependent account is requested in a login session started by approval of the login request received in the first login process; and
a registration process of, in a case in which an email indicative of information on a specific control window for generating an account is transmitted as a proxy invitation to an email address entered by the user in the login session started by approval of the login request received in the first login process, and the account is generated in response to an operation in the specific control window, generating the account setting data in which the generated account is set as a proxy account and an account corresponding to the login session is set as a dependent account, and registering the generated account setting data in the memory.

4. The authentication device according to claim 3, Wherein the login request to the dependent account is approved regardless of entry of authentication information on the dependent account by the user.

5. An authentication device comprising:
a memory that stores account setting data in which a first account from among plural accounts is set as a proxy account for which a second account from among the plural accounts has a proxy, in which the second account is set as a dependent account that depends upon the proxy account, and in which each of plural unique email addresses is associated with a respective one of the plural accounts; and a processor configured to execute processes comprising:

a first login process of, upon receipt of a login request which is accompanied by an entry of authentication information from a user, comparing the entered authentication information with authentication information associated with each of the plural accounts and approving the login request in a case in which it is determined that the entered authentication information matches authentication information of one of the plural accounts;

a second login process of approving login of the dependent account in a case in which login to the dependent account is requested in a login session started by approval of the login request received in the first login process; and a registration process of, in a case in Which an email indicative of information on a specific control window is transmitted as an invitation to dependence to a unique email address entered by the user in the login session started by approval of the login request received in the first login process, the specific control window being a window for authorization to associate an account corresponding to the login session with an account corresponding to the unique email address entered by the user, and an operation for the authorization is performed in the specific control window, generating the account setting data in which the account corresponding to the login session is set as a proxy account and the account corresponding to the unique email address entered by the user is set as a dependent account, and registering the generated account setting data in the memory.

6. The authentication device according to claim 5, wherein the login request to the dependent account is approved regardless of entry of authentication information on the dependent account by the user.

7. An authentication device comprising:

a memory that stores account setting data in which a first account from among plural accounts is set as a proxy account for which a second account from among the plural accounts has a proxy, and in which the second account is set as a dependent account that depends upon the proxy account; and a processor configured to execute processes comprising:

a first login process of, upon receipt of a login request which is accompanied by an entry of authentication information from a user, comparing the entered authentication information with authentication information associated with each of the plural accounts and approving the login request in a case in which it is determined that the entered authentication information matches authentication information of one of the plural accounts;

a second login process of approving login of the dependent account in a case in which login to the dependent account is requested in a login session started by approval of the login request received in the first login process; and a registration process of, in a case in which an email indicative of information on a specific control window for generating an account is transmitted as an invitation to dependence to an email address entered by the user in the login session started by approval of the login request received in the first login process, and the account is generated in response to an operation in the specific control window, generating the account setting data in which the generated account is set as a dependent account and an account corresponding to the login session is set as a proxy account, and registering the generated account setting data in the memory.

8. The authentication device according to claim 7, wherein the login request to the dependent account is approved regardless of entry of authentication information on the dependent account by the user.

\* \* \* \* \*

UNITED STATES PATENT AND TRADEMARK OFFICE
CERTIFICATE OF CORRECTION

PATENT NO. : 10,701,051 B2
APPLICATION NO. : 15/876531
DATED : June 30, 2020
INVENTOR(S) : Tsuyoshi Ohsumi Page 1 of 1

It is certified that error appears in the above-identified patent and that said Letters Patent is hereby corrected as shown below:

In the Claims

Column 16, Line 38, in Claim 3, delete "ease" and insert --case--.

Column 16, Line 60, in Claim 4, delete "Wherein" and insert --wherein--.

Column 17, Line 20, in Claim 5, delete "Which" and insert --which--.

Signed and Sealed this
Twenty-seventh Day of October, 2020

Andrei Iancu
*Director of the United States Patent and Trademark Office*